Oct. 3, 1950 J. F. DREYER 2,524,286
FLEXIBLE NONCRYSTALLINE SELF-CONTAINED POLARIZING
FILMS AND METHODS OF MAKING AND USING THE SAME
Filed May 14, 1946

INVENTOR
JOHN F. DREYER
BY
Blair, Curtis & Hayward
ATTORNEYS

Patented Oct. 3, 1950

2,524,286

UNITED STATES PATENT OFFICE 2,524,286

FLEXIBLE NONCRYSTALLINE SELF-CONTAINED POLARIZING FILMS AND METHODS OF MAKING AND USING THE SAME

John F. Dreyer, Springfield, Ohio, assignor, by mesne assignments, to John F. Dreyer, doing business as Dreyer Laboratories, Cincinnati, Ohio Application May 14, 1946, Serial No. 669,699

16 Claims. (Cl. 88—65)

This invention relates to oriented films and the method of making them. More particularly the invention relates to light-polarizing films of dyes, to composite and laminated films, to products embodying such films and to methods of making and using such films.

This application is a continuation-in-part of my copending application, Serial No. 384,550 (now Patent No. 2,400,877, dated May 28, 1946) filed March 21, 1941, as a continuation-in-part of my applications Serial Nos. 217,249 and 263,779 (now abandoned) filed July 2, 1938, and March 23, 1939, respectively.

In the past, light polarizing films have been formed of various crystalline materials but many difficulties have been encountered in the formation and use of these, both because of the difficulty in completely orienting small crystals or crystal particles and to difficulties in forming and limitations of the geometry of large crystals. As set forth in my said Patent No. 2,400,877, these difficulties can be overcome by using materials which can be passed through the nematic state and orienting the molecules to an external influence and maintaining such orientation by a controlled rapid solidification from the nematic state.

It is well recognized in the literature that there are many materials, including numerous dyes, which pass through the nematic state at a point in the process of solidification or fusion or in the process of passing from dissolved to solid form or from solid to solution. When in the nematic state the molecules of a substance have their axes parallel but are otherwise arranged quite irregularly and are free to move at random. When a dye, for example, is brought from a liquid state into a nematic state under normal conditions the molecules thereof aline themselves in parallelism within small areas or "swarms"; but, if they are subjected to an orienting influence as disclosed in my said patent, the molecules throughout the substance will come into parallelism with the orienting influence. The nematic state accordingly lends itself excellently to an orientation step; and there is provided a molecular alinement which, as set forth in my said patent, can be maintained as the substance is solidified so as to provide a permanent orientation excellently adapted for polarizing light. I have found, for example, that because of the inherently assured parallelism of molecules of a substance when in the nematic state only a very weak field is required to determine the direction of orientation; while the inherent molecular forces characteristic of the nematic state then bring about complete and uniform orientation throughout the film.

It is also set forth in my said patent that various dyes are useful as polarizing materials and the present invention relates to the suprising discovery that polarizing dyes when uniformly oriented can be provided in film form independent of a supporting backing on which they may be formed. There are many applications where it is advantageous to apply a polarizing film to an optical surface without subjecting the latter to the treatment necessary for forming the polarizing film. To this end it has been common practice heretofore to suspend or distribute polarizing crystals in plastic material capable of forming strong films; but the presence of the plastic diluent is objectionable and often imposes additional limitations on the use of the composite product.

In accordance with the present invention a thin transferable film is made suitable for application to various surfaces, e. g., much in the manner in which decalcomania is applied. Such films, surprisingly, may be unitary in themselves, i. e. composed essentially of the oriented dye; and pursuant to the invention, may be separably supported on flexible carrier film base; and/or may be provided with an adhesive coating whereby they may be united with a permanent support. These films may be supplied in continuous sheets or in special forms such as letters, arrows or other designs, which may be formed as such on supports of corresponding form or die cut from flat sheets; or they may be given a three dimensional form adapted to their intended application by forming on a temporary support of the same form. Thus, for example, convex or concave sheets suitable for application to lenses, lamps bulbs or the like may be formed on supports of suitable form, stripped with or without use of a temporary protective carrier sheet. Adhesive, e. g., a pressure sensitive adhesive may be applied to the surface which is to be secured to the lens, etc., or where the article is not subjected to surface abrasion or severe rubbing, the film may be applied without adhesive, relying on its high degree of flexibility to cling by its close conformity to the surface on which it is applied.

Pursuant to the invention, there are also provided various improved methods of making such polarizing films and products thereof. I have found, for example, that certain oriented films may be formed in situ on a support and stripped from the support without destroying the film or its orientation, and may thereafter be secured to a new support, as for example, a lens or window, a light bulb or tube, a dial facing, a transparent instrument cover, or the like.

Although for the most part these films will be produced originally on glass, other smooth surfaced supports may be used. It is an advantage of my invention that the films can be removed from the glass, etc., and applied to other carriers with entire flexibility. Intermediate films of foreign matter may be used to facilitate release. Thus, for example, I may coat a sheet of glass with a very thin film of paraffin wax, mineral oil, barium stearate, a resin or other material designed to assist in releasing the oriented polarizing material. The surface of this film may then be oriented by rubbing or brushing and the dye applied to it in a solution which does not dissolve the underlying foreign film. The dye is oriented and dried as above described.

If the oriented film is sufficiently strong, it is stripped from the glass, with or without soaking in a material which will release the foreign film, and is transferred to another supporting base or carrier. If the polarizing film is too delicate to transfer alone a reinforcing film of resin or other flexible material may be applied as a lacquer or pre-formed flexible film onto the polarizable coating after the latter has set or dried on the glass or other temporary support. The polarizing material and reinforcing film may then be stripped from the glass as a single film.

If the foreign film under the polarizing film is one which can be self-sustaining it can serve as the reinforcing film by being stripped from the glass, carrying with it the dye or other molecularly oriented material. Or a flexible supporting film made in other ways may have its surface oriented and coated with the oriented film as above described while the supporting film is stretched or supported on a suitable form or plate.

Thus, for example, a polarizing film, e. g., a methanol solution of methylene blue, may be formed on a sheet of mica and when suitably oriented and dried it may in turn be coated with a thin film of methyl methacrylate resin solution which does not dissolve the polarizing film. The resin film is then stripped off from the mica carrying with it the polarizing film. This stripping may be facilitated by the coating of foreign material, e. g. paraffin, by warming during the stripping, or by soaking in a water solution of a releasing agent, e. g. potassium iodide, or other bath which tends to break the adhesion between the polarizer, and the supporting base.

When the reinforcing carrier film serves as the base on which the polarizing film is formed, it should ordinarily be treated to make its surface anisotropic for orienting the nematic film. Thus a flexible film of cellulose acetate, thermoplastic vinyl resins such as the vinyl chloride-vinyl acetate copolymers sold under the name Vinylite, methyl methacrylate, or polystyrene resin, for example, may be formed or laid over a suitable supporting surface, and such film be rubbed or stretched to give an anisotropic surface, after which the nematic material is applied thereto, passed through the nematic state and dried. Thereafter both may be peeled off together. If the flexible carrier is formed on a rigid base, it may be desirable to first apply to the rigid base a foreign film and to soak in a releasing agent, such as e. g. a water solution of potassium iodide, to make the film strip off more easily.

Instead of only one side of the film being covered with resin, both may be so covered, one being combined therewith before stripping from the rigid base, and a further protective coating, e. g. methyl methacrylate resin, may be applied to it before or after it is stripped. If cellophane, cellulose ester, Vinylite or other stretched films are used to add strength to the flexible polarizing film they may also serve as a "wave plate" as set forth in my copending application Serial No. 745,267, filed May 1, 1947.

In the provision of adhesive films for application the polarizing film may be originally formed on a suitable supporting surface as described above and an adhesive layer then applied onto the exposed face. If the adhesive film is to be rolled upon itself, the opposite face should be such as will readily pull free from the adhesive which clings to the back of the film, or a separator may be used between the face of the film and the adhesive when rolled, e. g. a holland cloth or coated paper, etc. The adhesive if one with considerable tensile strength may serve as the reinforcement without other supporting carrier. The adhesive may be of the pressure-sensitive or other permanently tacky type, or of the type which is rendered tacky by the application of water or other solvent, by heat, or by other agency.

For the tacky type adhesives I may use (compounded rubber), chlorinated latex, polyisobutylene of low molecular weight, polyvinyl butyral plus a plasticizer, etc. For the solvent type I may use polyvinyl butyral, gelatine, etc.

The initial temporary base can be sized paper, cellophane, metal foil, or other sheet or object which provides a suitable surface. When desired for support or mechanical protection an additional layer of resin may be provided on the side of the dye material or other oriented material which is opposite the side carrying the adhesive. If desired, the dye or other polarizing material may be oriented on the resin backing itself and the adhesive applied either before or after the orientation. In certain instances, the adhesive may be applied with a brushing action which in itself imparts the anisotropy necessary for orientation of the dye, and the dye then applied to the adhesive layer.

The adhesive may be applied to the dye side of a backed assembly or to the backing side.

For example, I may apply Benzo Fast Blue 4GL (Color Index Number 533) to an oriented glass surface, bring it through the nematic state into the solid state, coat the dye with the polymerized acrylic acid resin Acryloid in xylol, dry, and dip in a solution of alum. The alum mordants the dye and on soaking loosens it from the glass whence it can be removed and further processed. An alcohol-soluble dye such as Methylene Blue (Color Index Number 922) containing sufficient alcohol-soluble resin such as vinyl acetate to give strength can be applied to glass and oriented thereon by means of an external polarizing field or by a preliminary brushing or other treatment of the glass. It may then be loosened from the glass by dipping in a solution of potassium iodide. Instead of or in addition to the use of an included resin, a polarized and solidified methylene blue film may be coated with a resin such as polyisobutylene dissolved in benzol. After stripping, the film can be further protected, if desired, by applying a coating of resin to the exposed side.

A flexible plastic base such as cellulose acetate, Vinylite, ethyl cellulose, cellophane, for example, with previous brushing or stretching to orient the surface particles thereof, or stretching, may be coated with a dye or other dichroic material and treated to bring the latter through the nematic state, so that the particles will be oriented to the orientation of the surface of the plastic, and then solidified. The dichroic material may then be permanently fixed as by mordanting and may be protected if desired by an overcoating of flexible plastic. Adhesive may be applied as above.

Although in the drawings and in the following specification I have described and shown certain preferred embodiments of my invention and suggested various alternatives and modifications thereof, it is understood that these are not intended to be exhaustive nor limiting of the invention but, on the contrary, are given with a view to illustrating and explaining the principles of the invention and their embodiment for practical use, in order that others skilled in the art may be enabled to adapt and modify them in numerous embodiments and modifications, each as may be best adapted to the conditions of any particular use.

In the drawings:

Figure 1 is a sectional view illustrating a manner in which a material such as indicated above may be provided;

Figures 2-6 inclusive are similar views illustrating other modifications;

Figure 1:
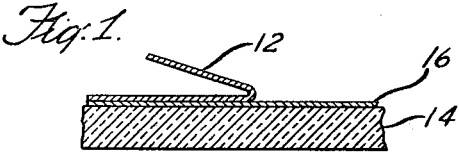

In Figure 1 is shown a film 12 embodying the present invention in process of being transferred from a glass plate 14 coated with paraffin at 16.

The film shown has been made by applying a thin layer of melted paraffin to the surface of the glass 14, allowing it to solidify, rubbing along the lines of desired orientation. Advantageously a wetting agent which is compatible with the dye used is applied to the surface of the paraffin prior to the rubbing so that a very thin film of it remains adsorbed on the surface. To this prepared surface I apply a film of a water solution of a dye which can pass through the nematic state, the solution as applied being somewhat more dilute than the nematic state and carefully filtered free of any crystalline particles and being free likewise from any dissolved material which would precipitate in crystalline form before the dye is dried.

The coated glass plate with the dye film is then exposed to a gentle stream of dry air at about 85° F., whereupon the dye solution passes quickly through the nematic phase, in which it is oriented to the lines of rubbing on the base, and is dried before reorientation. A second dye may be applied over the first or a backing of flexible resin lacquer to reinforce the oriented film if it lacks the necessary tensile strength for the desired handling.

The film 12 thus formed, when fully dry may be stripped from the supporting plate 14 as shown in Figure 1, and to facilitate this, the plate is heated slightly above the fusion point of the paraffin. The film 12 when thus released may be transferred to any support on which it is to be used.

Figure 2:
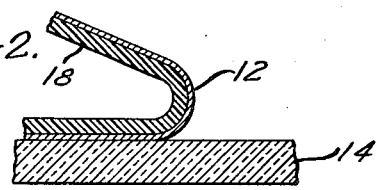

Although it is an important factor in my invention that the dye film has surprising cohesive strength, due, I believe, to the molecular orientation; it is ordinarily desirable to increase the strength of the film, for handling, by applying to it a temporary or permanent flexible backing film 18 over the dye 12 (Figure 2). This reinforcing backing, in the example illustrated in Figure 2, is an Acryloid resin lacquer film applied in a xylol solvent vehicle.

The stripping of the film is advantageously done in the same direction as the lines of orientation, since, as with most oriented film, its strength is greatest along the direction of orientation.

Figure 3:
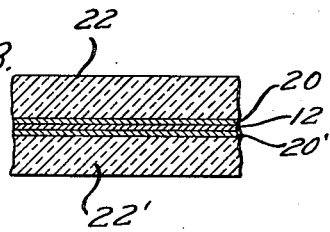

After stripping from the temporary support 14, the film 12 may be applied to any article which it is desired to make polarizing. For aircraft windows, automobile and marine windshields, etc., it may be spread out on the surface of a transparent plate, e. g. of glass, methyl methacrylate polymer etc. and covered with a second plate by which the film is fully protected. Advantageously this assembly is effected in a vacuum frame. Such a "sandwich" is shown in exaggerated cross section in Figure 3. In this case the film formed and transferred as described in connection with Figures 1 and 2 is applied to the adhesive layer 20 on the glass plate 22. The temporary backing film 18 may then be treated to release it from film 12 and stripped therefrom, or if desired this film may be left in place. Finally the other plate 22' and adhesive layer 20' are applied and the assembly pressed, with heating if necessary, to form a unitary product.

Alternatively, a base 14 such as cellulose acetate, Vinylite, glass or metal foil may be coated with an ordinary wettable adhesive 16, such as gelatine which retains considerable tensile strength when softened with water and adheres less strongly to the base. A dichroic dye 12 is applied thereto in an organic solvent which does not dissolve or objectionably swell the gelatine. The adhesive, with or without swelling with water, will strip with the dye film and may be used to apply it to a surface where its polarizing properties are to be used. After transferring the film the gelatine may be washed away with warm water or swelled and stripped, or may merely be softened and used as an adhesive to stick the polarizing film to its permanent support.

Instead of applying the polarizing film onto a pre-formed carrier film 18a, a carrier film may be formed in situ on a rigid base. Thus a layer 18a of methyl methacrylate or Acryloid resin may be formed on a glass support 14a and its surface rubbed to give the desired orientation, and the polarizing layer 12a then formed on the surface thereof. The assembly 18a—12a may then be stripped from the plate 14a with or without treatment to release film 18a therefrom.

The film 12 of oriented dye material may also be directly protected on both sides either permanently or temporarily by flexible protective layers and in such case one of the layers of adhesive material, e. g. 20', may optionally be omitted if the film 12 is applied directly to the flexible film. If the protective layers are to provide permanent protection, at least one should be formed of transparent material such for instance as glass, methyl methacrylate resin, cellophane, etc.

The dye may be applied directly to a naturally oriented support, as for example mica without the surface rubbing if the orientation is sufficiently strong and uniform, but even such oriented supports are advantageously treated by rubbing in a direction to give an orientation coincident with the natural surface orientation of the material. Thus a film of a dye such as Benzo Fast Blue 4GL (Color Index Number 933), may be formed on a mica base advantageously with a very thin intermediate separating layer to facilitate stripping of the dye film from the mica support. The flexible backing film 18 in such case may be methyl methacrylate resin or Acryloid resin, for example, and may be applied on the exposed surface of the dried film 12. Thus a solution of Acryloid resin in xylol may be sprayed, dried and the whole dipped in an alum; the laminated film may then be stripped as a unit from the support.

Figure 4:
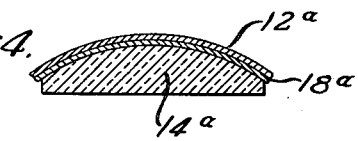

For application to lenses and other curved surfaces the polarizing film may be formed on a support of similar form, e. g., as shown in Figure 4. In this case the transfer film is intended to be applied to the back of a concave-convex lens and therefore the reinforcing and protective film, e. g. cellophane 18a with its direction of stretching substantially coinciding with the direction of orientation desired of the polarizing film, is first applied to the support, stretching and if necessary softening with water or other swelling agent to fit it exactly and smoothly onto the curved surface. The surface of the cellophane is then rubbed along the lines of desired orientation, the dye film 12a spread on, passed through the nematic state and quickly dried. When the film 18a is lifted from the support 14a it carries with it the polarizing film 12a, which may thereupon be applied to the surface of the lens, with or without use of a suitable adhesive, e. g. optical pitch, Canada balsam, etc., and with or without application of a cover glass or second lens element to protect its surface.

Figure 5:
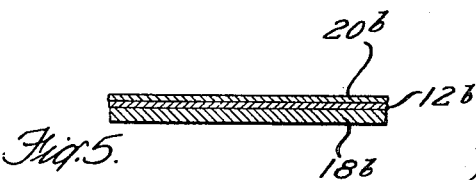

A film carrying a tacky adhesive is shown in Figure 5. This comprises a layer 12b of oriented dye and a coating 20b of a suitable tacky material, for instance a pressure-sensitive adhesive such as used in so called masking tape and transparent adhesive tape. This assembly may be formed on a backing, e. g., of flexible film 18b in the manner indicated in Figure 4, and the tacky material applied after the formation and solidification of the oriented film, or a supporting film may be used which also serves as the adhesive upon application of heat or a solvent.

A protective layer of holland cloth, cellophane, etc., may be provided in the usual manner to protect the layer of tacky material and may be removed when the layer 12 is to be applied onto a surface. Ordinarily, where a permanently tacky adhesive layer 20 is carried on the polarizing film 12, the latter will be backed with a stronger film 18; but, if desired, the latter may be of a type or treated with a material which releases the polarizing film 12 when suitably treated after application to a permanent support.

Figure 6:
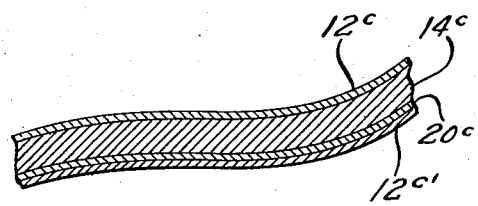

The present invention may also be applied to combination of polarizing films, e. g., subtractive combinations of colored films to produce a particular spectral distribution, especially a neutral white or gray, embodying the invention of my copending application Serial No. 669,698, filed May 14, 1946. For instance, by applying different polarizing dye films onto the same central support member there may be provided a polarizing sheet in which the several oriented portions combine to give a desired total effect which none alone could give. In Figure 6, for instance, there is shown a transparent flexible support 14c of suitable material such for instance as cellophane having on one side thereof a directly applied dye layer 12c oriented in the manner described above, and on the other side a different dye layer oriented in the same direction so as to polarize light similarly. This second dye layer is transferred as above described and applied to the cellophane without disturbing the first. It may be applied directly onto the first, or as shown onto the opposite side of the support.

For instance, Naphthol Yellow S (Color Index Number 10) is oriented to provide the layer 12c on one side of the supporting film and Toluidine Blue (Color Index Number 925) is oriented to provide the layer 12c' on the other side of the supporting member 14c. Whether the two dye films are chosen to give a neutral gray or some other desired hue, they will ordinarily be polarized in substantially the same direction. Such orientation may be effected by moving the film 14c between rubbing surfaces to orient the particles on both surfaces prior to the application of the dye films as by dipping or by successive coating operations or the sheet 14a may be dipped in or coated with the dyes and the assembly subjected to suitable electrically-induced or other orienting influence. An assembly which is oriented throughout may be provided by pre-stretching the cellophane sheet 10. In some instances an angular relation between two polarizing films may be desired, and the present invention affords a desirable way of attaining that result. For example, two layers having a small angle between their respective orientation axes will give a combined effect which is less critical to angle with respect to glare elimination, etc. Claims to this subject matter are included in my application Serial No. 746,205, filed May 6, 1947, now abandoned.

For some purposes also, it is desirable to have two layers oriented perpendicularly. Thus, lettering or images formed by the nematic dye and subsequently dried to an oriented polarizing film may be applied by printing from type or plates or by spray and stencil processes, and different images, etc., brought out by viewing through differently oriented analyzers. In this way different images of the same object may be viewed on a common page or screen by the two eyes to give a stereoscopic effect. Or alternating images can be brought out for advertising etc., by illuminating alternately with light polarized at different angles.

Figure 7:
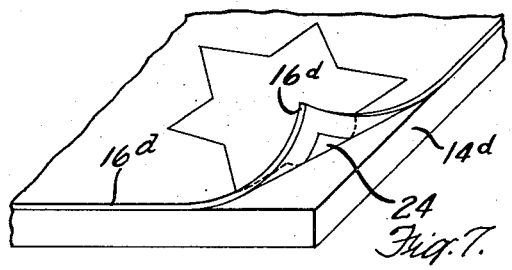
Figure 7 is a fragmentary perspective view illustrating another modification.

In instances where differential light effects on a single medium are desirable, as in instrument dials, clock faces, advertising devices, and the like, the invention lends itself with particular effectiveness to the provision thereof as is exemplified in Figure 7. A glass base 14d may have its upper surface oriented, as by brushing, and there may be applied to certain selected portions thereof a dichroic dye material in a particular desired shape or shapes 24 as in the shape of the star shown. There may thereupon be laid thereon with or without cementing, a layer 16d of transparent plastic or flexible film such for instance as cellophane to which the dye will adhere while it is being stripped from the base. The plastic film carrying with it the design of the star is shown in Figure 7 in process of being stripped, one corner of the star showing at 24.

When a self-contained dye film is desirable or when for other reasons a thick film is sought, thicker films than those which can be laid down at a single wetting may be provided by successive applications with or without intermediate treatment. For instance, an aqueous solution of Benzo Fast Blue FR (Color Index Number 933) may be applied to an oriented surface, allowed to pass through the nematic state in which it will partake of the orientation of the surface and solidified while oriented and then dipped in aluminium chloride to render it water resistant. One or more subsequent layers of water solution of this dye are thereupon applied with intermediate treatments with aluminum chloride until built up to the desired thickness whereupon the thick film may be stripped from the original surface. In instances where films composed of several dyes as set forth and claimed in my copending application Serial No. 669,698, filed herewith are desired, thick films may be formed by successive applications of different dyes. For instance, Benzo Fast Blue FR (Color Index Number 933) may be applied and made water resistant with aluminum chloride as above and then covered with Chloramine Yellow (Color Index Number 814). A water soluble dye may, moreover, be coated with a water insoluble dye or vice versa as, for example, by applying Benzo Fast Blue FR (Color Index Number 933) and then following it with an alcohol solution of Methylene Blue (Color Index Number 922).

I have found that many polar substances capable of forming dichloric films are handled to better advantage, especially on an inorganic supporting surface, if they are aided by a polar substance the molecules of which include both lipophilic (i. e. attracted to organic substances of the fatty or hydrophobic types) and hydrophilic groups. Such substance may be applied as a sub-film on the supporting base and oriented by rubbing; or where it is compatible with development of the nematic phase of the solutions it may be added to the dichroic or potentially dichroic substance. This is particularly true of nonsubstantive dyes and especially of dyes having long chain linear molecules which are not cationic-active; whereas those having more stubby molecular structure or greater lateral extension in a flat molecule ordinarily are more easily oriented on clean rubbed glass without the use of sub-films according to the present invention. The linear-molecule substance may be made suitable for orientation on clean glass by addition of a cationic-active group or by the use of a foreign substance on the glass of the type hereinafter set forth. I may use as such foreign substance a film which renders the dried nematic film releasable from the base, whereby the oriented film may be more readily stripped or transferred to another surface on which it could not have been conveniently oriented.

It is, in fact, one important advantage of the use of such materials that the intentional additions of foreign substances overcome haphazard effects due to air-borne dirt or substances accidentally occurring on the rubbing pad, etc., and thus assure more uniform and accurately reproducible results.

The foreign substance used may be applied to the supporting surface before the brushing for orientation is begun, or it may be applied during the brushing operation. The materials preferred for use as the foreign substance for the oriented base or sub-film according to this invention depend to some extent upon the dichroic substance used for the oriented film. In general, I have found useful the long chain amino and hydroxy compounds such as polyvinyl alcohol, methyl cellulose, especially water soluble methyl cellulose, cellulose acetate and other cellulose substances, lauryl amines and the like. For many purposes, the use of wet paper gives very good results when used as the means of brushing a base substance, such as glass, and the cellulosic material rubbed off onto the surface may be sufficient to serve the purposes of this invention.

Similar types of compounds, especially the long chain amino compounds are effective when added to the compound which is to be oriented in the film. This suggests that such sub-film or under layer may act chemically by molecular association, e. g., through coordinate linkage, with the oriented molecules of the applied film; and that these added linear compounds, whichever way they are used, serve in some way to assist in holding the oriented molecules in proper space relation.

Among the compositions which orient better by aid of such foreign substance, the following are given as examples:

Fast Green B conc.
Brilliant Yellow

As an example, the surface of a glass plate or lens is first cleaned by washing with lauryl amine used as the detergent, rinsing with clear water, again applying lauryl amine and wiping dry. The surface is then rubbed with a clean cloth or brush or block of elastic material, e. g., by a rotating clean disc, brush or buffing wheel, or by manual rubbing with a clean cloth or elastic block, always using care to keep the direction of rubbing in line with the lines of the desired orientation of the polarizing material.

As an example of the addition of the foreign substance to the dichroic substance, I have found that the dye Color Index No. 195 (Mordant Yellow O) which is believed to have the formula:

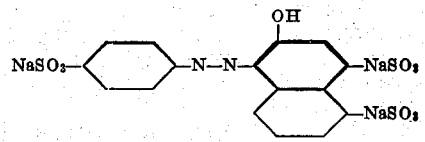

is improved for orientation on rubbed clean glass surfaces more or less proportionally by additions of Lorol dimethyl amine hydrochloride ("Lorol" indicating a commercial mixture of higher alkyls with lauryl predominating) up to a proportion of one mole, of the alkyl amines per mol of the dye. It seems probable that the alkyl amine adds to the sulfonic group replacing the sodium and the critical point may therefore be due to formation of salt or perhaps to an excess of amine salt, which may interfere with crystal orientation, "salting out" or other extraneous effects.

Another example of this effect of added lipophilic-hydrophilic substance is found in the metal cyanine dyes wherein the addition of a small proportion of Lorol dimethyl amine to the dye improves the ability of the dye to orient on rubbed clean glass surfaces.

The surface to be coated with an orientable film may be simultaneously cleaned and coated, e. g., by rubbing with a foreign substance having a cleaning action and likewise an orienting action, as, for example, paper dipped in a water solution of Lorol trimethyl ammonium hydrochloride.

Figure 8:
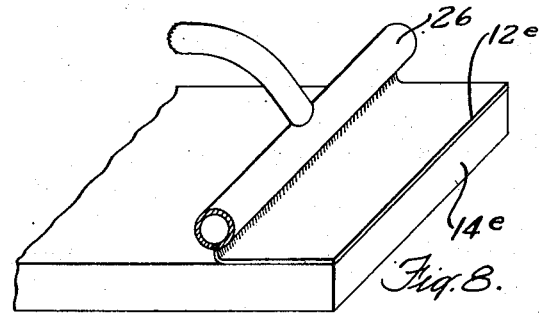
Figures 8 and 9 are somewhat schematic perspective views illustrating one manner of forming a polarized product in accordance with the invention.
Figure 9:
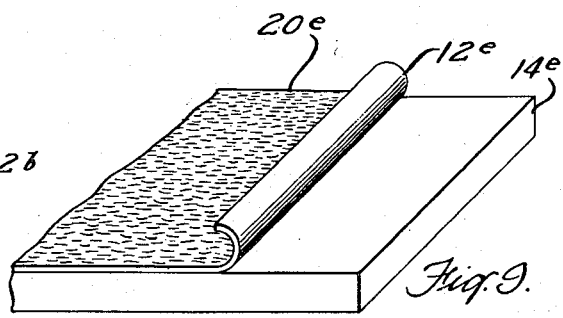

As indicated in Figures 8 and 9, a supporting glass plate 14e after rubbing with Lorol dimethyl amine hydrochloride as indicated above to provide an anisotropic surface, is coated with a film 12e of a suitable dye, as for instance Mordant Yellow O, applied to this surface by means of a spray 26. The resulting liquid film is dried rapidly so as to pass through the nematic state and when fully oriented to solidify suddenly to facilitate the substantially complete orientation of the molecules of the dye in the oriented film. If desired, an adhesive 20e may be then applied as by a spraying, and the composite film thus formed may be stripped from the base 14e as indicated in Figure 9 and used, as by being applied to the surface of lens, showcase, window, etc.

I claim:

1. The method of producing a flexible film of relatively high tensile strength which comprises exposing to an orienting field on an anisotropic supporting surface an isotropic liquid film composed of a substance which exhibits a nematic phase, bringing said substance into the nematic phase while under the influence of said field to reproduce in the film the anisotropy of said supporting surface, and fixing the molecular orientation of the anisotropic nematic liquid by drying said film at a rate sufficiently rapid to preclude crystal formation but not so rapid as to cause ebullition, and stripping the dried film from said support.

2. The process of providing a polarizing element which comprises applying in a fluid state onto a carrier, a material which will pass through the nematic state orienting the material while in said nematic state and solidifying the said material while oriented on said carrier, separating from the carrier the film thus formed, and securing the film to a supporting surface.

3. The process of providing dichroic film which comprises applying in a fluid state onto a carrier, a material which will pass through the nematic state orienting the material while in said nematic state and solidifying the material while oriented on said carrier, forming a protective flexible pellucid film on the oriented solidified material, stripping the oriented material with its protective film from the support.

4. In a process of preparing a continuous dichroic film by brushing a surface in a given direction, applying to said surface a liquid comprising a dichroic substance capable of existing in the nematic state, orienting the molecules of said dichroic substance in the nematic state on and with respect to said brushed surface, and solidifying said dichroic substance from the nematic state without disturbing the orientation thereof, the improvement which comprises providing on said surface prior to a brushing step a long-chain polar organic compound comprising both lipophilic and hydrophilic groups which rub the surface during the brushing to assist in orienting the molecules thereof.

5. A polarizing medium comprising a continuous non-crystalline film composed substantially of Mordant Yellow O having its molecules substantially all oriented along approximately parallel lines.

6. The process of providing on a base dichroic film which comprises treating the surface of a flexible carrier sheet to produce a predetermined anisotropy thereon, applying to the resulting anisotropic surface a film of a solution of a dichroic dye of the type which exhibits the nematic state, bringing said film into the nematic state while on said surface and thereby orienting the molecules of the film to the anisotropy of the surface, drying the film without destroying said orientation, applying the film thus formed while still on said sheet to said base, and thereafter stripping said carrier sheet from the oriented film leaving said film on the base.

7. The process of forming a dichroic film which comprises providing a substance of the class consisting of long chain organic polar compounds having both lipophilic and hydrophilic groups, brushing a carrier surface along lines which are approximately parallel to, respectively adjacent lines of brushing, with said substance present on said surface, applying to said surface a fluid comprising a dichroic material capable of being brought into the nematic state, bringing said material to the nematic state and solidifying it without ebullition but too rapidly for its nematic orientation to be lost, soaking in a liquid which does not dissolve said film and separating said film from said support.

8. In a process of preparing a continuous dichroic film by brushing a surface along predetermined lines whereby an orienting field is provided, applying to said surface a liquid comprising a dichroic substance capable of existing in the nematic state, orienting the molecules of said dichroic substance in the nematic state on and by exposure to the orienting field provided by said brushed surface, and solidifying said dichroic substance from the nematic state without disturbing the orientation thereof, the improvement which comprises applying to said surface before the final brushing is completed, an organic polar compound having a long chain lipophilic group and a hydrophilic group, of the class consisting of hydroxy and amino groups, whereby the long-chain organic compound is oriented by said brushing to impart a greater orienting influence on the subsequently applied nematic substance.

9. A flexible polarizing film which comprises a homogeneous layer substantially composed of dichroic material having long chain molecules and of the type which is passed from fluid form through a nematic phase wherein the molecules of said material have been oriented, respectively, in substantially parallel cohesive relation to the neighboring molecules of said material and wherefrom the material has been solidified, whereby said layer is capable of independent existence as such, and the orientation of said molecules in said layer being distinct from any anisotropy of any supporting surface.

10. A flexible light-polarizing film which comprises a homogeneous film composed substantially of dichroic material having long chain molecules and of the type which is passed from fluid form thru a nematic phase wherein the molecules of said material have been oriented, respectively, in substantially parallel cohesive relation to the neighboring molecules of said material and wherefrom the material has been solidified, said film being free from any supporting base.

11. A flexible light-polarizing film which comprises a smooth-surfaced supporting layer, and a layer substantially composed of dichroic material having long chain molecules and of the type which is passed from fluid form thru a nematic phase wherein the molecules of said material have been oriented, respectively, in substantially parallel cohesive relation to the neighboring molecules of said material and wherefrom the material has been solidified, whereby said layer is capable of independent existence as such apart from a conforming surface support, and the orientation of said molecules in said layer being distinct from any anisotropy of the surface of said supporting layer.

12. A flexible light-polarizing film which comprises a smooth surfaced supporting layer, and a layer of Mordant Yellow O releasably adherent thereto, the molecules of said material being oriented, respectively, in substantially parallel cohesive relation to the neighboring molecules of said material, whereby said layer can be removed as such from said support without fracture and the orientation of said layer being distinct from any anisotrophy of said supporting layer.

13. A flexible light-polarizing film which comprises a smooth surfaced supporting layer, and a layer substantially composed of dichroic material of the type which has long chain molecules and which is passed from fluid form thru a nematic phase wherein the molecules of said material have been oriented, respectively, in substantially parallel cohesive relation to the neighboring molecules of said material and wherefrom the material has been solidified, and an adhesive film between said layers by which the dichroic layer is held to the supporting layer.

14. A flexible light-polarizing film which comprises a smooth surfaced supporting layer, and a layer of dichroic material of the type which has long chain molecules and which exhibits a nematic phase, the molecules of said material being oriented, respectively, in substantially parallel cohesive relation to the neighboring molecules of said material, and a temporary adhesive between said layers by which the dichroic layer is held to the supporting layer, but which is capable of being released by a liquid under conditions which do not affect the other said layers.

15. A flexible light-polarizing film which comprises a smooth surfaced supporting layer, and a layer substantially composed of dichroic material of the type which has long chain molecules and which is passed from fluid form through a nematic phase wherein the molecules of said material have been oriented, respectively, in substantially parallel cohesive relation to the neighboring molecules of said material and wherefrom the material has been solidified, and a readily fusible adhesive film which is disposed between said layers and which melts below the melting point of either of said layers.

16. A flexible light-polarizing film which comprises a smooth-surfaced supporting layer, and a layer of dichroic material of the type which has long, flat molecules and which is passed from fluid form through a nematic phase wherein the molecules of said material have been oriented, respectively, in substantially parallel cohesive relation to the neighboring molecules of said material and wherefrom the material has been solidified, and a foreign film between said layers which is capable of being softened to facilitate such stripping.

JOHN F. DREYER.

REFERENCES CITED

The following references are of record in the file of this patent:

UNITED STATES PATENTS

| Number | Name | Date |
| --- | --- | --- |
| 1,873,951 | Zocher | Aug. 30, 1932 |
| 1,956,867 | Land | May 1, 1934 |
| 2,011,553 | Land | Aug. 13, 1935 |
| 2,046,924 | Pendergast | July 7, 1936 |
| 2,158,129 | Land | May 16, 1939 |
| 2,173,304 | Land et al. | Sept. 19, 1939 |
| 2,236,972 | Kasemann | Apr. 1, 1941 |
| 2,237,567 | Land | Apr. 8, 1941 |
| 2,256,108 | Blake | Sept. 16, 1941 |
| 2,274,706 | Keim | Mar. 6, 1942 |
| 2,286,569 | Pollack | June 16, 1942 |
| 2,351,933 | Decker et al. | June 20, 1944 |
| 2,398,506 | Rogers | Apr. 16, 1946 |
| 2,400,877 | Dreyer | May 28, 1946 |
| 2,409,564 | Heinecke et al. | Oct. 15, 1946 |
| 2,454,515 | Land | Nov. 23, 1948 |

OTHER REFERENCES

Foex, in Faraday Society London Transactions, volume 29.2, 1933, pages 968, 969.